United States Patent

[11] 3,563,226

[72] Inventors John D. Rockenfeller
Glastonbury;
Melvin L. Zwillenberg, Hartford, Conn.;
Calvin A. Gongwer, Glendora, Calif.
[21] Appl. No. 819,062
[22] Filed Apr. 24, 1969
[45] Patented Feb. 16, 1971
[73] Assignee United Aircraft Corporation
East Hartford, Conn.

[54] CHEMICALLY FUELED HEATER
25 Claims, 3 Drawing Figs.
[52] U.S. Cl........................................ 126/204,
126/263
[51] Int. Cl......................................... A61f 7/06,
F24j 1/00
[50] Field of Search............................ 126/204,
263; 165/46

[56] References Cited
UNITED STATES PATENTS
3,161,192 12/1964 McCormack.................. 126/204
3,367,319 2/1968 Carter, Jr. ..................... 126/204
3,402,709 9/1968 Shivers et al.................. 126/204
3,450,127 6/1969 Harwood, Jr.................. 126/204

Primary Examiner—Charles J. Myhre
Attorney—Donald F. Bradley

ABSTRACT: A chemically fueled heater is disclosed in which gaseous oxygen is combined with phosphorus in a reactor to generate heat for heating a fluid circulated in the reactor. The heated fluid is circulated into a heating coil or other object to be heated. Automatic controls are provided for the oxygen flow to regulate the temperature of the reaction and also to regulate the temperature of the fluid.

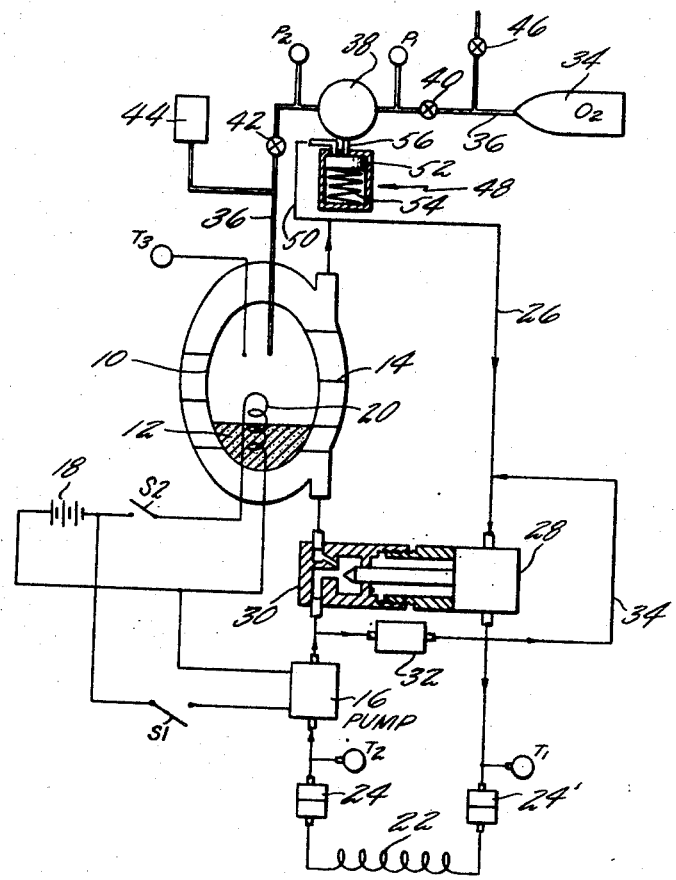

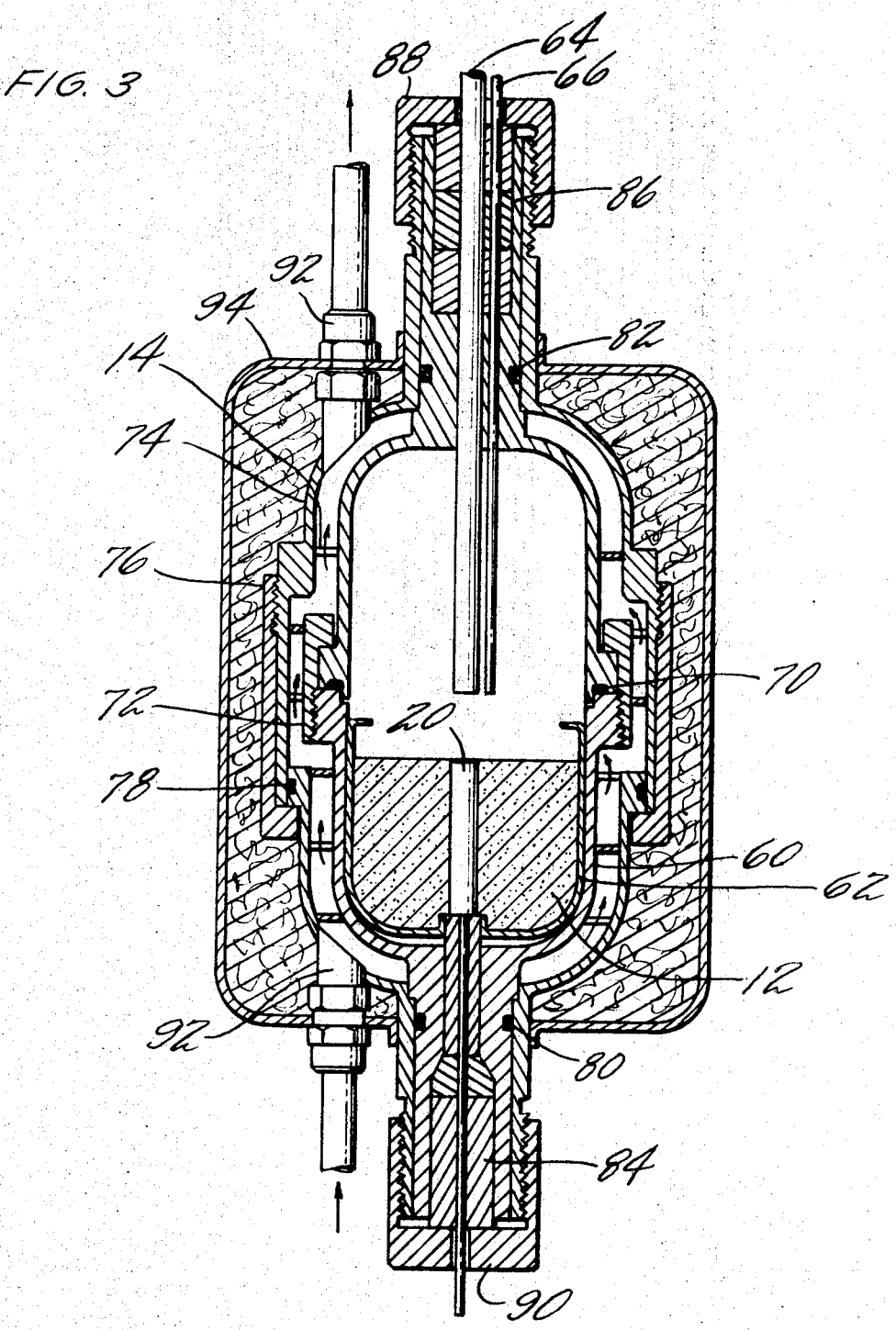

3,563,226

CHEMICALLY FUELED HEATER

BACKGROUND OF THE INVENTION

1. Field of the Invention

This invention relates to a chemically fueled heater, and particularly to a heat generating power source in which an oxidizer such as oxygen is combined in a reactor with a pyrophoric substance such as phosphorus. A fluid such as water is heated by circulation through the reactor and pumped into a heating coil which is contained, for example, in a diver's suit.

It is often desirable to generate heat under conditions where free air is not available for use as an oxidizer, where a system of minimum weight, volume and expense is desirable, and where the liberation of byproduct gas is not acceptable. One such application is the heating of undersea shelters, vehicles and divers. Another application is the use of heat so generated to provide propulsion or electrical power through appropriate energy conversion schemes. For use in manned applications the heat generating power source should be readily throttlable, safe to operate, emit no toxic effluents, and for certain applications should emit no detectable effluents and have a minimum volume.

The present invention satisfies the above criteria, and uses a solid or liquid fuel and a separately stored oxidizer under pressure, the reaction between the fuel and oxidizer in a reactor producing the heat required. A fluid such as water is heated by circulating the water through channels in or around the reactor. A control system is provided to regulate the temperature of the water and the amount of heat fed into the object to be heated. A further control system is provided to regulate the flow of oxidizer to the reactor to thereby regulate the heat generated by the reaction.

2. Description of the Prior Art

The reaction between an oxidizer and a pyrophoric material to generate heat is well known in the art. For example, in U.S. Pat. No. 3,161,192, liquid air or oxygen is fed into a chamber containing a pyrophoric material such as iron or iron sulfide to heat air or oxygen fed through the chamber. The heated air or oxygen is then fed into a protective garment to act as an air supply and to provide heating.

However, in the prior art, there is no convenient way of controlling the heat generated in the reaction between the pyrophoric substance and the oxidizer to adjust the heating of the fluid. The oxidizer flow is regulated manually.

In the present invention automatic means are provided for sensing the temperature and pressure of the heated fluid and regulating both the temperature of the fluid and the rate of the reaction to produce a fully automated system. The simplicity, low weight and small size of the unit, together with the automatic regulation of the self-contained unit, makes the unit quite attractive for use in underwater systems such as for diver's suits.

SUMMARY OF THE INVENTION

A primary object of the present invention is to provide an improved chemically fueled underwater heater.

In accordance with the present invention, a supply of liquid or gaseous oxygen or oxidizer is fed into a reactor which contains a pyrophoric substance such as phosphorus. The fluid to be heated, water for example, is fed through channels in or around the reactor to absorb heat from the reaction which takes place there. The heated water is pumped through a heating coil which may be contained in a diver's suit. The temperature of the water is controlled by a bypass system which senses the water temperature and mixes with the heated water an appropriate quantity of cooler water which has already passed through the heating coil.

In accordance with a further aspect of the present invention, the temperature within the reactor itself is varied by raising or lowering the pressure of the oxygen supplied to the reactor in order to maintain a flow of oxygen into the reactor sufficient to maintain the desired heat extraction rate. In normal operation the rate of heat extraction from the reactor is independent of water flow and is dependent only on reactor temperature.

This invention permits automatic and self-contained regulation of the heat provided to an object such as a diver's suit.

BRIEF DESCRIPTION OF THE DRAWINGS

FIG. 3 shows in detail a cross-sectional view of the construction of the reactor.

DESCRIPTION OF THE PREFERRED EMBODIMENT

Figure 1:
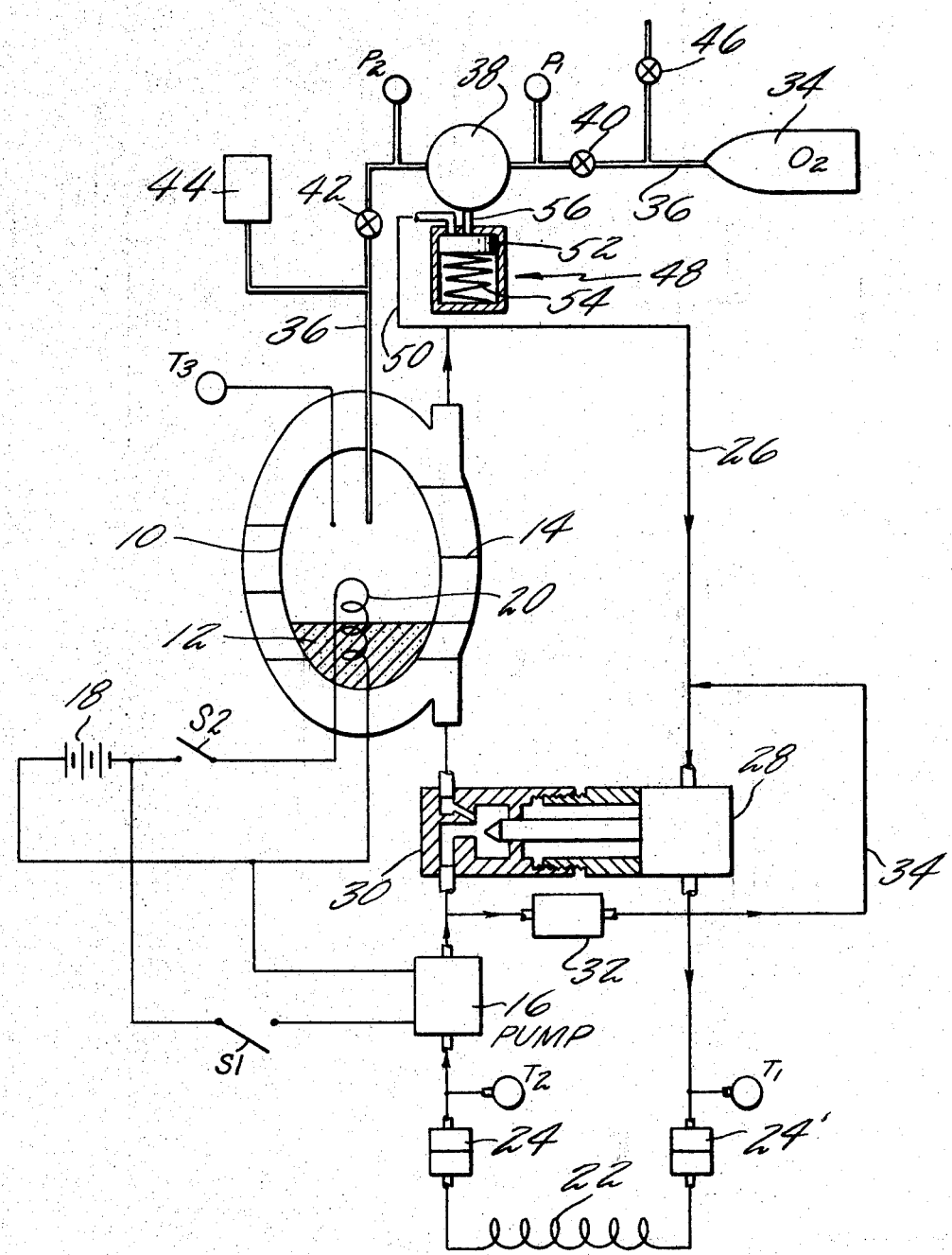
FIG. 1 is a schematic representation of the reactor and the associated control system.

Referring to FIG. 1 there is shown one configuration of the apparatus required to operate and control the reaction between a pyrophoric substance and an oxidizer. The preferred pyrophoric substance is white or yellow phosphorus, while gaseous oxygen is an appropriate oxidizer. Other fuels and oxidizers may be used.

A reactor 10 is filled to approximately one-third its volume with phosphorus. The volume of the reactor 10 is preferably designed so that it will accommodate approximately twice the volume of phosphorus pentoxide remaining when the reaction between the phosphorus and oxygen is complete.

After loading the phosphorus 12 into the reactor 10, the reactor is filled with helium or some other inert gas at approximately atmospheric pressure. The purpose of the inert gas is to serve as a diluent.

As will be described in detail, gaseous oxygen is fed into the reactor and heat is generated by virtue of the reaction between the phosphorus and the oxygen in the reactor.

A cooling water jacket surrounds the reactor 10 and the water contained therein absorbs heat from the reaction within the reactor 10. The water jacket contains baffles 14 to spread the water flow uniformly over the reactor surface. The cooling water is circulated by a pump 16. The reactor 10 is shown in greater detail in FIG. 3.

Pump 16 is powered by a rechargeable battery 18 and controlled by a switch $S_1$. The battery 18 may also be used to power an igniter 20 which is a coil of resistance wire positioned in the reactor 10. A switch $S_2$ is connected between the battery and the igniter. The purpose of the igniter is to raise the temperature of the pyrophoric material 12 and the oxygen to more easily start the reaction. However, as will be discussed later, the igniter 20 may not be necessary.

A heating load 22 shown as a heating coil in a diver's suit is connected in the water flow system by means of quick disconnect-type fittings 24 and 24'. As the heated water leaves the reactor 10, it is fed through a pipe 26 and through a thermostatic actuator 28 to the heating coil 22. Upon leaving the heating coil, the water flows through pump 16 and a valve 30 back into the reactor 10. The temperature of water entering and leaving the heating coil 22 may be read on temperature sensors $T_1$ and $T_2$ connected in the water flow lines.

The temperature of the water flowing into the heating coil 22 is regulated by valve 30 in conjunction with the thermostatic actuator 28. As the temperature of the water passing through the actuator 28 rises above a preset level, actuator 28 closes valve 30 proportionally with the rise in temperature. The pressure drop across valve 30 increases as the valve closes, and part of the water flow is diverted through a pressure relief valve 32 and through line 34 back into line 26. This part of the water flow does not pass through the reactor and no longer absorbs heat from the reactor. Pressure relief valve 32 is set for a low pressure of about 5 p.s.i. to permit it to be opened by an increase in the pressure drop across valve 30 as the valve closes.

The reduction of the rate of water flow in the water jacket of reactor 10 by virtue of the opening of valve 32 will result in an increase of water jacket temperature and a consequent increase in pressure in the system. This increase is caused first by the thermal expansion of liquid water within the water jacket which is a constant volume system, and as the temperature is increased the increase in pressure is caused by the vapor pressure or boiling of water.

In FIG. 1 the oxygen for the reaction is supplied to the reactor by an oxygen tank 34 through a line 36 into the reactor 10. In the line 36 is regulator valve 38. The oxygen supply stored in tank 34 is in gaseous form under pressure. Any other source of oxygen would be entirely satisfactory. The reactor temperature may be varied by raising or lowering the oxygen pressure supplied to the reactor 10 by the pressure regulator valve 38.

As described previously, the reactor 10 initially contains an inert gas such as helium at atmospheric pressure and room temperature. Other inert gases such as nitrogen, neon, argon, krypton or xenon may be used. When the outlet pressure of the regulator valve 38 is raised above atmospheric pressure, oxygen flows into the reactor 10 and the temperature within the reactor rises until the pressure in the reactor is nearly equal to the oxygen inlet pressure. The pressure in the reactor comprises the inert gas, vaporized phosphorus oxides, and oxygen. Thus the flow rate of oxygen into the reactor equals the oxygen consumption rate in the reactor.

Connected also in line 36 is a valve 40 which is a shutoff valve for the oxygen supply, and a damping valve 42 which is a micrometer valve and which serves the purpose of damping any flow irregularities in the oxygen supply system. Damping valve 42 may be replaced by a small fixed orifice. A pressure relief valve 44 protects against over-pressurization of the reactor 10, and is typically set at 90 pounds per square inch. Also connected in line 36 is a valve 46 which may be opened or closed manually to exhaust all the oxygen from tank 34, or to charge the tank 34 from an outside source.

Pressure gauges $P_1$ and $P_2$ indicate the oxygen tank pressure and regulator valve output pressure respectively. A thermocouple and temperature readout unit $T_3$ measure the internal reactor temperature.

Any increase in pressure in the water system caused by a rise in water temperature due to reduction of the rate of water flow within the reactor is transmitted to a piston and spring assembly 48 which will reduce the pressure setting of oxygen pressure regulator 38. As shown, the pressure of the water which leaves the reactor through line 26 is fed through line 50 into the piston and spring assembly 48. This pressure acts on piston 52 in a negative direction, and is counteracted by the positive force of spring 54. The piston 52 is connected to regulator valve 38 through a rod 56. As the pressure increases, piston 52 is displaced negatively and reduces the pressure setting of pressure regulator 38. This decreases the flow of oxygen into the reactor thereby reducing the heat generated in the reaction.

The reaction within the reactor 10 will always tend to an equilibrium condition. The partial pressure of oxygen in the reactor is small compared with the other constituents because of the high rate of reaction of the oxygen with hot phosphorus. If the reactor temperature drops, the reactor pressure will drop resulting in an increased flow of oxygen into the reactor and a return to equilibrium. If the reactor temperature rises, expansion of the helium and increased vapor pressure of the condensed phosphorus oxide will cause an increase in reactor pressure and a decrease in oxygen flow into the reactor, and again a return to equilibrium.

Except at extremely low water flow rates, the dominant resistance to heat transfer is on the gas side, inside the reactor. Thus, except at extremely small water flows, the rate of heat extraction from the reactor is independent of water flow, and is dependent only on reactor temperatures. Thus a decrease in cooling water flow rate caused by the opening of bypass valve 32 results in an increase in the temperature rise of water in the reactor jacket, but the total heat output is constant. No change in the temperature of the water flowing to the heating coil 22 will result because the stream of water passing through the reactor jacket and the stream of bypass water through pressure valve 32 are mixed before the water flows to the heating load 22. Thus a decrease in temperature of water flowing to heating coil 22 requires a decrease in the setting of the pressure regulator 38, and this decrease is provided by the piston and spring assembly 48.

It is feasible to operate the system without the piston and spring assembly 48 by setting regulator 38 by hand. In this mode, only slow, easily correctable drifts in reactor temperature occur. However, the automatic adjustment is more convenient and more accurate.

Figure 2:
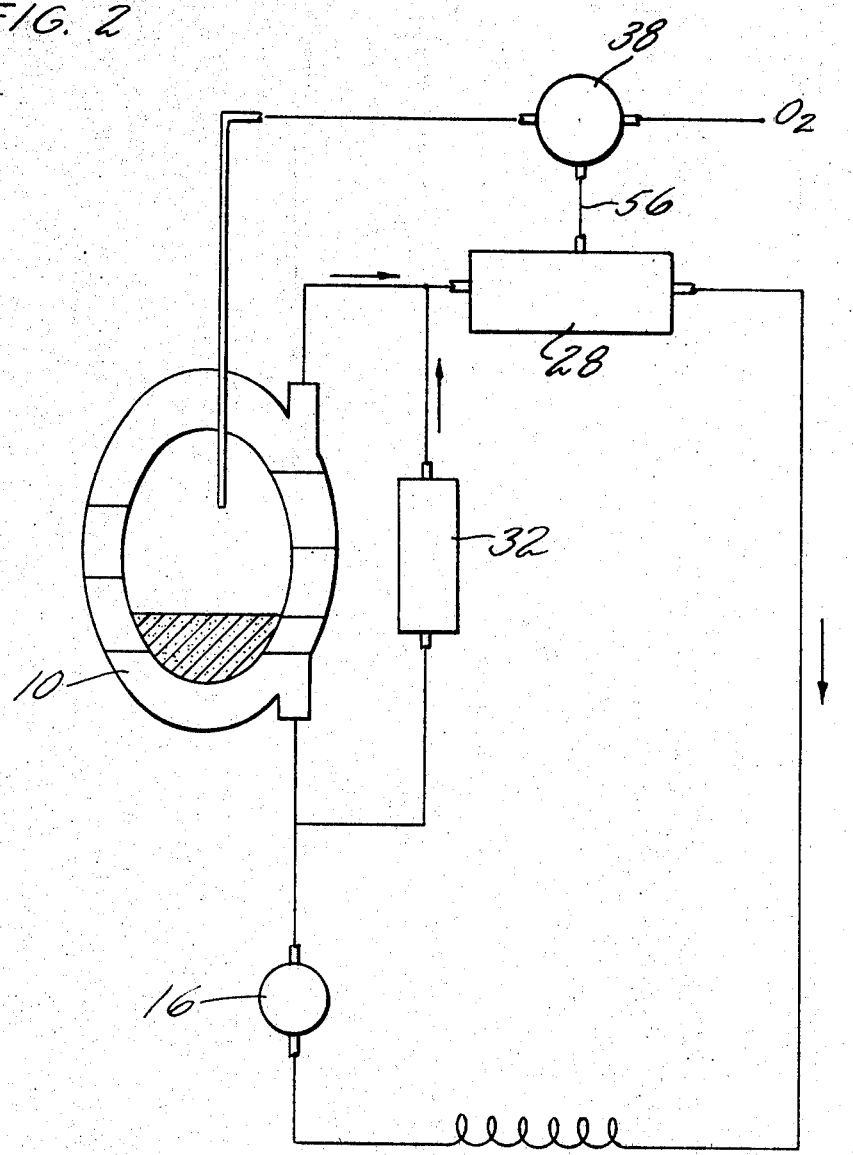
FIG. 2 shows schematically an alternate control system.

FIG. 2 shows an alternate simplified control system which eliminates the piston and spring assembly 48. In this embodiment thermostatic actuator 28 is directly connected to rod 56 of pressure regulator 38. Valve 30 is optional, and is not shown in FIG. 2. The regulator 38 is thus directly controlled by the temperature of the water passing through thermostatic actuator 28, and not by the pressure in reactor 10. The system may also be operated by sensing the water temperature at the output of the heating coil rather than the input, and adjusting the reactor accordingly.

This modification may be used when an open heating cycle is desired in which the heated water is not recycled. However this type of system is inherently less reliable in that independent controls are not used for the water temperature and for the reactor temperature.

Reactor operation and control have been found experimentally to be most satisfactory using one atmosphere absolute pressure of helium as a diluent. However, it is possible to use other inert diluents such as argon and nitrogen. It is also possible to operate without the inert diluent, but operation is less satisfactory.

FIG. 3 shows in detail the construction of reactor 10.

The reactor is a triple-walled steel chamber. The inner chamber is surrounded by shell 60 and contains the gaseous oxygen-helium atmosphere molten phosphorus, heater, thermocouple and gas inlet. The phosphorus 12 is contained within a replaceable cup 62. The heater 20 is provided for ignition. Oxygen is admitted through tube 64 and temperature is observed by means of thermocouple 66. Pressure in the reactor is measured by means of a gauge attached to pressure tube 68.

The inner shell 60 may be composed of an upper half and a lower half joined at the center of the unit. The joint is sealed by a Viton "O" ring 70 and held together during assembly by a threaded nut 72.

A series of baffles 14 are used to provide lateral flow of cooling water across and/or around the chamber. The jacket 74 contains the coolant water. The jacket 74 is composed of two sections joined at the center by collar 76. The joint is sealed by a sliding Viton "O" ring 78. The jacket 74 is also sealed at the end extensions of inner chamber 60 by two Viton "O" rings 80 and 82 which also provide sliding seals.

The tubes and wires leading into the chamber through the end extensions are sealed by commercially available seals 84 and 86. End nuts 88 and 90 exert the force which seals the entire unit, the force compressing end seals 84 and 86 and being transmitted through chamber walls 60 to compress seal 70. This compressive force is balanced by a tension force in the jacket 74 and collar assembly 76, which, because of their design, need only be loosely tightened for assembly. The sealing forces exerted by end nuts 88 and 90 thus are evenly distributed over the entire unit, resulting in a lighter and smaller seal than previously available.

Two fittings 92 connect the reactor to the external system and provide input and exit channels for the circulating water. A shell 94 is provided for insulation from the surroundings.

Other types of reactors may obviously be used.

The phosphorus-oxygen reactor 10 has been demonstrated to operate satisfactorily when inverted, lying on its side or when rotated through a circle in a vertical plane. Thus the apparatus is quite satisfactory for use in heating divers or vehicles which must change attitude.

While it is desirable to use igniter 20 to begin the reaction between the phosphorus and the oxygen, it has been found possible to ignite the reaction spontaneously without use of igniter 20 merely by admitting oxygen to the reactor. For the reaction to occur without the igniter, a clean phosphorus surface is desirable. To operate without the igniter, the reactor should be loaded by melting phosphorus in an inert atmosphere, pouring it into the reactor and allowing it to solidify, or by placing freshly cut phosphorus sticks directly into the reactor in an inert atmosphere without melting.

Once the reactor has been ignited, it is possible to repeatedly stop and restart the reactor spontaneously. The surface of the phosphorus appears to be sufficiently cleaned by the combustion reaction so that repeated spontaneous restarts, even after long cooling, are possible upon admitting oxygen into the reactor. The oxide produced during burning is porous and does not interfere with spontaneous ignition as does the coating normally present on commercial white phosphorus sticks.

Thus this invention presents a novel method of producing in a small volume a considerable amount of energy for underwater applications through the reaction of a fuel such as white phosphorus and an oxidizer such as oxygen, and also provides automatic or manual control of the heat output rate by means of a control of oxidizer pressure. The system also includes appropriate controls to insure safe operation. The system can operate inverted or in any other attitude, is capable of spontaneous ignition by the addition of oxygen without any external ignition system, and can be restarted repeatedly. The system has a high energy density, possesses no gaseous products as effluent, and is safe, reliable, controllable and efficient.

It is to be understood that the invention is not limited to the specific embodiment herein illustrated and described but may be used in other ways without departure from its spirit as defined by the following claims.

We claim:

1. A heating apparatus for underwater applications comprising:
    a reactor,
    a phosphorus containing material at least partially filling said container,
    a source of oxidizer,
    means for feeding said oxidizer into said reactor to produce combustion between said phosphorus containing material and said oxidizer,
    means responsive to the pressure in said reactor for regulating the flow of oxidizer into said reactor to control the temperature in said reactor,
    means for passing water through said reactor whereby said water is heated, and
    means for passing said heated water to an output device.

2. A heating apparatus as in claim 1 in which said oxidizer is oxygen gas.

3. A heating apparatus as in claim 1 and including means responsive to the temperature of said water for regulating the flow of water through said reactor.

4. Apparatus for generating heat comprising:
    a reactor containing a pyrophoric material,
    a source of oxidizer,
    means for feeding said oxidizer into said reactor to produce combustion, and
    pressure regulating means responsive to the pressure in said reactor for regulating the flow of oxidizer into said reactor and controlling the temperature in said reactor.

5. Apparatus as in claim 4 and including an inert gas in said reactor, said pressure responsive means being responsive to the partial pressure of said inert gas in said reactor.

6. Apparatus as in claim 5 and including:
    means for passing a fluid through said reactor whereby said fluid is heated, and
    means for feeding said heated fluid to an output device.

7. Apparatus as in claim 6 and including means for recirculating the fluid from said output device into said reactor.

8. Apparatus as in claim 7 and including means for mixing said recirculated fluid with said heated fluid to regulate the temperature of the fluid flowing into said output device.

9. Apparatus as in claim 6 and including means responsive to the pressure of said fluid in said reactor for varying the setting of said pressure regulating means.

10. Apparatus as in claim 9 in which said means for varying the setting of pressure regulating means includes a piston and spring.

11. Apparatus as in claim 6 and including means responsive to the temperature of said fluid for varying the setting of said pressure regulating means.

12. Apparatus as in claim 6 and including means responsive to the temperature of said fluid for varying the flow of fluid through said reactor.

13. Apparatus for providing heat to an output device comprising:
    a closed reactor at least partially filled with phosphorus,
    a source of oxygen,
    means for feeding a selected amount of oxygen into said reactor to produce combustion at a selected temperature,
    means responsive to the pressure in said reactor for regulating the flow of oxygen into said reactor to maintain said selected temperature,
    means for passing a fluid through at least a portion of said reactor to provide heat to said fluid, and
    means for feeding said heated fluid to an output device.

14. Apparatus as in claim 13 in which a preselected volume of inert gas is incorporated in said reactor.

15. Apparatus as in claim 14 in which said inert gas is helium.

16. Apparatus as in claim 13 in which said oxygen is in gaseous form and is fed through a pressure regulator into said reactor, the pressure difference between the pressure at said regulator and the pressure in said reactor determining the flow rate of said oxygen into said reactor.

17. Apparatus as in claim 16 and including means responsive to the pressure of said fluid in said reactor for varying the pressure at said regulator and varying the flow rate of said oxygen into said reactor.

18. Apparatus as in claim 17 and including means responsive to the temperature of said fluid for varying the flow rate of fluid through said reactor.

19. Apparatus as in claim 16 and including means responsive to the temperature of said fluid for varying the pressure at said regulator and varying the flow rate of said oxygen into said reactor.

20. Apparatus as in claim 19 in which said fluid is recirculated from said output device into said reactor and in which said temperature responsive means senses the fluid temperature at the downstream end of said output device.

21. Apparatus as in claim 13 and including means for varying the temperature of fluid fed into said output device.

22. Apparatus as in claim 13 in which said fluid is water.

23. Apparatus as in claim 13 in which said output device is a diver's suit.

24. A method for heating an underwater object comprising the steps of:
    feeding gaseous oxygen into a closed reactor containing phosphorus to produce a reaction therebetween which generates heat,
    passing a fluid through said reactor to be heated therein,
    circulating said heated fluid to the object to be heated, and
    varying the flow of oxygen into said reactor in response to the pressure in said reactor.

25. A method as in claim 24 and including the step of varying the flow of fluid through said reactor in response to the temperature of said heated fluid.